(12) United States Patent
Ma et al.

(10) Patent No.: US 10,725,646 B2
(45) Date of Patent: Jul. 28, 2020

(54) METHOD AND APPARATUS FOR SWITCHING SCREEN INTERFACE AND TERMINAL

(71) Applicant: GREE ELECTRIC APPLIANCES, INC. OF ZHUHAI, Zhuhai, Guangdong (CN)

(72) Inventors: Yingjiang Ma, Guangdong (CN); Linlin Diao, Guangdong (CN)

(73) Assignee: GREE ELECTRIC APPLIANCES, INC. OF ZUHAI, Zhuhai, Guangdong (CN)

( * ) Notice: Subject to any disclaimer, the term of this patent is extended or adjusted under 35 U.S.C. 154(b) by 59 days.

(21) Appl. No.: 15/778,260

(22) PCT Filed: Nov. 18, 2016

(86) PCT No.: PCT/CN2016/106427
§ 371 (c)(1),
(2) Date: May 23, 2018

(87) PCT Pub. No.: WO2017/107714
PCT Pub. Date: Jun. 29, 2017

(65) Prior Publication Data
US 2018/0348980 A1 Dec. 6, 2018

(30) Foreign Application Priority Data

Dec. 23, 2015 (CN) .......................... 2015 1 0982495

(51) Int. Cl.
*G06F 3/048* (2013.01)
*G06F 3/0487* (2013.01)
(Continued)

(52) U.S. Cl.
CPC .......... *G06F 3/0487* (2013.01); *G06F 3/0488* (2013.01); *G06F 3/04812* (2013.01);
(Continued)

(58) Field of Classification Search
CPC ...................................................... G06F 3/048
See application file for complete search history.

(56) References Cited

U.S. PATENT DOCUMENTS

| 8,669,945 | B2 | 3/2014 | Coddington |
| 2014/0026099 | A1* | 1/2014 | Andersson Reimer ...................... G06F 3/0482 715/825 |

(Continued)

FOREIGN PATENT DOCUMENTS

| CN | 103279266 A | 9/2013 |
| CN | 103793134 A | 5/2014 |

(Continued)

OTHER PUBLICATIONS

WIPO, International Search Report dated Feb. 13, 2017.
European Patent Office, European patent search report dated Jul. 10, 2019.

*Primary Examiner* — Pei Yong Weng
(74) *Attorney, Agent, or Firm* — Li & Cai Intellectual Property (USA) Office

(57) ABSTRACT

Provided are a method and apparatus for switching screen interface and Terminal. The method for switching screen interface includes: detecting a first actual pressing period of pressing any point in a screen operation area by a user's finger; when the first actual pressing period is greater than or equal to a first preset pressing period, starting an interface switching mode at a current interface, that is, generating a set of application icons in the screen operation area where the user's finger can touch for the user to select; and based on the application icon sets, enabling the current interface to skip to a corresponding application interface in one step by clicking an application icon needing to be selected. The method has the beneficial effects of convenient use, large application range and good user experience.

14 Claims, 4 Drawing Sheets

(51) Int. Cl.
 *G06F 3/0488* (2013.01)
 *G06F 3/0481* (2013.01)
 *G06F 3/0485* (2013.01)
(52) U.S. Cl.
 CPC ...... *G06F 3/04817* (2013.01); *G06F 3/04886* (2013.01); *G06F 3/0485* (2013.01)

(56) References Cited

U.S. PATENT DOCUMENTS

| | | | | |
|---|---|---|---|---|
| 2014/0035826 A1* | 2/2014 | Frazier | ................ | G06F 3/0482 345/173 |
| 2014/0075388 A1* | 3/2014 | Kuscher | ................ | G06F 3/0482 715/834 |
| 2016/0259495 A1* | 9/2016 | Butcher | ................ | G06F 3/0482 |

FOREIGN PATENT DOCUMENTS

| | | | |
|---|---|---|---|
| CN | 104185835 | A | 12/2014 |
| CN | 104375776 | A | 2/2015 |
| CN | 105468258 | A | 4/2015 |
| CN | 104866199 | A | 8/2015 |
| CN | 104991700 | A | 10/2015 |
| CN | 105117099 | A | 12/2015 |
| CN | 105159446 | A | 12/2015 |
| CN | 105183277 | A | 12/2015 |
| CN | 205692148 | U | 11/2016 |
| EP | 2602702 | A2 | 6/2013 |
| EP | 2927788 | A1 | 10/2015 |
| EP | 2602702 | A3 | 3/2017 |

* cited by examiner

METHOD AND APPARATUS FOR SWITCHING SCREEN INTERFACE AND TERMINAL

TECHNICAL FIELD

The embodiments of the disclosure relate to the technical field of communications, particularly to a method and apparatus for switching screen interface, and a terminal, and more particularly to a method and apparatus for quickly switching a screen interface with one hand, and a terminal.

BACKGROUND

The update of communication terminals is changing with each passing day. With the increase in visual requirements of users, the size of a terminal screen is getting greater and greater, thereby making it difficult for a user to hold and control a terminal with one hand. For example, when the user operates the screen, it is difficult to simultaneously operate a "back key" or "home key" at the lower portion of the screen under the one-handed condition. When the user wants to switch interfaces, such as skipping to other applications and returning to a home page, it is often necessary to use the "back key" or "home key" at the lower portion. It is often necessary to use two hands before it can be implemented, thereby causing inconvenience for the user.

The one-handed mode provided in the related art may be processed by the zooming of a display interface (e.g., a zooming interface 202 shown in FIG. 5), so that the display interface enters a one-handed control range of the user, thereby achieving the one-handed holding and manipulating of a large-screen terminal.

However, the existing methods still have defects. The zoomed display interface is generally reduced to four corners of a screen. When the reduced screen display interface is reduced to the top, if the screen size is relatively large, when the user operates the display interface reduced to the top, the "back key" or "home key" at the lower portion of the screen is still difficult to handle with one hand. In addition, an operation switched to other application interfaces under one-handed operation is not optimized for easy operation, so that the user cannot control the terminal more easily under one-handed operation.

SUMMARY

The embodiments of the disclosure provide a method and apparatus for switching screen interface, and a terminal, so as to solve the problem that a user cannot conveniently perform one-handed operation under more scenarios, thereby enabling the user to conveniently perform one-handed operation under more scenarios.

According to an embodiment of the disclosure, a method for screen interface switching is provided. The method includes: detecting a first actual pressing period of pressing any point in a screen operation area by a user's finger; in a case that the first actual pressing period is greater than or equal to a first preset pressing period, starting an interface switching mode at a current interface, wherein starting an interface switching mode at a current interface includes: generating a set of application icons in the screen operation area where the user's finger can touch for the user to select; and based on the set of application icons, enabling the current interface to skip to a corresponding application interface in one step by clicking an application icon needing to be selected.

In an embodiment of the disclosure, the method further includes: detecting whether the users finger presses any point in the screen operation area; and in a case that the user's finger presses any point in the screen operation area, detecting a first actual pressing period of pressing any point in the screen operation area by the user's finger.

In an embodiment of the disclosure, the method further includes: in a case that it is detected that the interface switching mode has been started, detecting a second actual pressing period of pressing a screen by the user's finger; and in a case that the second actual pressing period is greater than or equal to a second preset pressing period, expanding the set of application icons.

In an embodiment of the disclosure, the step of expanding the set of application icons includes: extending and displaying additional application icons in an extending direction of the set of application icons to display the additional application icons, in the screen operation area through the user toggling back and forth along the extension direction of the set of application icons.

In an embodiment of the disclosure, the step of expanding the set of application icons further includes: expanding another set of application icons on the periphery of the set of application icons, to switch displaying of the set of application icons and the other set of application icons in the screen operation area through the user toggling back and forth along the extension direction.

In an embodiment of the disclosure, the method further includes: in a case that the first actual pressing period is smaller than the first preset pressing period, maintaining the current interface; and/or, in a case that the second actual pressing period is smaller than the second preset pressing period, maintaining an interface displaying the set of application icons for the user to select.

In an embodiment of the disclosure, at least one of the set of application icons and the other set of application icons is a sector application icon set, and at least one is configured to automatically sort application icons according to the user's use habits; and in a case that the set of application icons and the other set of application icons are sector application icon sets, the radius of the other set of application icons is greater than the radius of the set of application icons; and/or the user's operations on the screen include at least one of the following: a pressing operation, a clicking selection operation, and a toggle operation.

According to another embodiment of the disclosure, a apparatus for screen interface switching apparatus is provided for matching the above method. The apparatus includes: a pressing period detection component, configured to detect a first actual pressing period of pressing any point in a screen operation area by a user's finger; an switching interface mode starting component, configured to start, when the first actual pressing period is greater than or equal to a first preset pressing period, an interface switching mode at a current interface, wherein starting an interface switching mode at a current interface includes: generate a set of application icons in the screen operation area where the user's finger can touch for the user to select; an application icon selection component, configured to click an application icon needing to be selected based on the set of application icons; and an application interface switching component, configured to enable the current interface to skip to a corresponding application interface in one step.

In an embodiment of the disclosure, the apparatus further includes: a hand-held motion detection component, configured to detect whether the user's finger presses any point in the screen operation area, wherein the pressing period detection component is configured to detect, when the user's finger presses any point in the screen operation area, a first actual pressing period of pressing any point in the screen operation area by the user's finger.

In an embodiment of the disclosure, the apparatus further includes: an application icon set expansion component, configured to: detect, when it is detected that the interface switching mode has been started, a second actual pressing period of pressing a screen by the user's finger; and expand, when the second actual pressing period is greater than or equal to a second preset pressing period, the set of application icons.

In an embodiment of the disclosure, the application icon set expansion component includes: an extension display sub-component, configured to extend and display additional application icons in an extending direction of the set of application icons, to display the additional application icons in the screen operation area through the user toggling back and forth along the extension direction of the set of application icons.

In an embodiment of the disclosure, the application icon set expansion component further includes: a peripheral display sub-component, configured to expand another set of application icons on the periphery of the set of application icons, to switch displaying of the set of application icons and the other set of application icons in the screen operation area through the user toggling back and forth along the extension direction.

In an embodiment of the disclosure, the switching interface mode starting component is further configured to maintain, when the first actual pressing period is smaller than the first preset pressing period, the current interface; and/or, the application icon set expansion component is further configured to maintain, when the second actual pressing period is smaller than the second preset pressing period, an interface displaying the set of application icons for the user to select.

In an embodiment of the disclosure, at least one of the set of application icons and the other set of application icons is a sector application icon set, and at least one is configured to automatically sort application icons according to the user's use habits; and when the set of application icons and the other set of application icons are sector application icon sets, the radius of the other set of application icons is greater than the radius of the set of application icons; and/or the user's operations on the screen include at least one of the following operation: a pressing operation, a clicking selection operation, and a toggle operation.

According to yet another embodiment of the disclosure, a terminal is provided for matching the above apparatus. The terminal includes: the above-mentioned screen interface switching apparatus.

Other features and advantages of the embodiments of the disclosure will be set forth in the following specification, and will be partially obvious from the specification, or may be learned by implementing the embodiments of the disclosure.

The technical solutions of the embodiments of the disclosure will be further described in detail below with reference to the accompanying drawings and embodiments.

BRIEF DESCRIPTION OF THE DRAWINGS

The accompanying drawings are used to provide a further understanding of the embodiments of the disclosure and constitute a part of the specification, are used together with the embodiments of the disclosure to explain the embodiments of the disclosure, and do not constitute a limitation to the embodiments of the disclosure. In the drawings.

With reference to the accompanying drawings, the reference signs in the embodiments of the disclosure are as follows:

102—signal detection unit; 1022—finger action detection component; 1024—pressing period detection component; 104—mode switching unit; 1042—switching interface mode starting component; 1044—application icon set expansion component; 10442—delay display component; 10444—peripheral display component; 106—application switching unit; 1062—application icon selection component; 1064—application interface switching component; 200—original interface; 201—one-handed control area; 202—zooming interface; 203—back key; 204—home key; 205—menu key; 400—processing component; 4001—processor; 401—communication unit; 402—power component; 403—memory; 404—input/output interface; 4041—touch-sensitive surface; 4042—other input devices; 405—display unit; 4051—display panel; 406—sensor; 407—audio circuit; 408—wireless communication unit; 409—Radio Frequency (RF) component.

DETAILED DESCRIPTION OF THE EMBODIMENTS

To make the objectives, technical solutions and advantages of the embodiments of the disclosure clearer, the following clearly and completely describes the technical solutions of the embodiments of the disclosure with reference to specific embodiments of the embodiments of the disclosure and corresponding drawings. Obviously, the described embodiments are merely some but not all of the embodiments of the disclosure. All other embodiments obtained by a person of ordinary skill in the art based on the embodiments of the disclosure without making creative efforts shall fall within the scope of protection of the embodiments of the disclosure.

Figure 1:
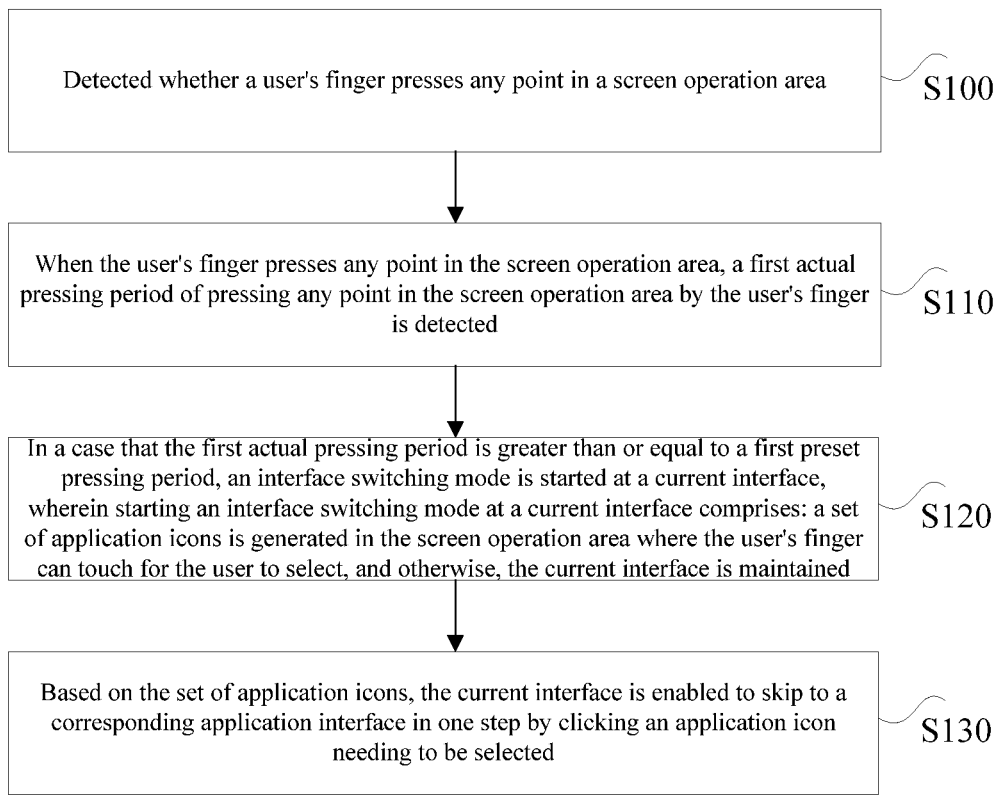
FIG. 1 is a flowchart of an embodiment of a method for switching screen interface according to the disclosure.

According to the embodiments of the disclosure, a screen interface switching method is provided. As shown in FIG. 1 (a flowchart of an embodiment of the method of the embodiments of the disclosure), the method for switching screen interface includes the steps as follows.

At S110, a first actual pressing period of pressing any point in a screen operation area by a user's finger is detected. By detecting the period of pressing any point in the screen operation area by the user's finger, the detection mode is simple, and the detection result is high in reliability.

In an implementation mode, before S110, the method may further include: S100: it is detected whether the user's finger presses any point in the screen operation area. Further, at S110, in a case that the user's finger presses any point in the screen operation area, a first actual pressing period of pressing any point in the screen operation area by the user's finger is detected. By detecting the user's finger motion in advance and starting an interface switching mode when the user presses any point on the screen for at least a first predetermined period, the starting efficiency of the interface switching mode may be saved, and the reliability thereof may be improved.

At S120, when the first actual pressing period is greater than or equal to a first preset pressing period, an interface switching mode is started at a current interface, wherein starting an interface switching mode at a current interface include: a set of application icons is generated in the screen operation area where the user's finger can touch for the user to select. In an embodiment of the disclosure, in S120, in a case that the first actual pressing period is smaller than the first preset pressing period, the current interface is maintained. By using the detection result indicative of that the users finger presses and holds any point in the screen operation area to judge whether to start the interface switching mode, the reliability is high, and the accuracy is good.

In an implementation mode, after S120, the method may further include:

S200: In a case that it is detected that the interface switching mode has been started, a second actual pressing period of pressing a screen by the user's finger is detected; and S220: In a case that the second actual pressing period is greater than or equal to a second preset pressing period, the set of application icons is expanded. In an embodiment of the disclosure, in S210, when the second actual pressing period is smaller than the second preset pressing period, the current interface, namely an interface displaying the set of application icons for the user to select, is maintained.

Herein, the operation that the set of application icons is expanded may include: additional application icons are extended and displayed in an extending direction of the set of application icons, to display the additional application icons in the screen operation area through the user toggling back and forth along the extension direction of the set of application icons. The extending direction refers to a direction extending from one end of the set of application icons to a direction away from the set of application icons.

Or, the operation that the set of application icons is expanded may include: another set of application icons is expanded on the periphery of the set of application icons, to switch displaying of the set of application icons and the other set of application icons in the screen operation area through the user toggling back and forth along the extension direction.

Thus, by generating a set of application icons and correspondingly expanding afterwards, the number of application icons displayed in a limited area of the screen and the update efficiency may be increased to improve the capacity and processing capability of the method for switching screen interface. Moreover, by maintaining the corresponding current interface when the corresponding actual pressing period is shorter than the corresponding preset pressing period, the false operation rate is reduced, the reliability and accuracy of control are improved, and the user experience is further improved.

In an embodiment of the disclosure, at least one of the set of application icons and the other set of application icons is a sector application icon set, and at least one is configured to automatically sort application icons according to the user's use habits; and when the set of application icons and the other set of application icons are sector application icon sets, the radius of the other set of application icons is greater than the radius of the set of application icons, so as to improve the convenience of display and check. Through automatic sorting, it is beneficial for the user to enter the required application interface more quickly, the convenience of use is further improved, and the user experience is better.

At S130, based on the set of application icons, the current interface is enabled to skip to a corresponding application interface in one step by clicking an application icon needing to be selected. By directly clicking on the required application icon from the set of application icons, the user may skip to the corresponding application interface in one step. The operation mode is simple, and the period taken is short, which is conducive to further improving the convenience of use and humanization.

In an embodiment of the disclosure, the user's operations on the screen include at least one of the following operation: a pressing, a clicking selection operation, and a toggle operation, specifically one-handed operation. Through the one-handed operation, the convenience and efficiency of using a large-screen terminal by the user are greatly improved, thereby being more humanized.

Figure 6:
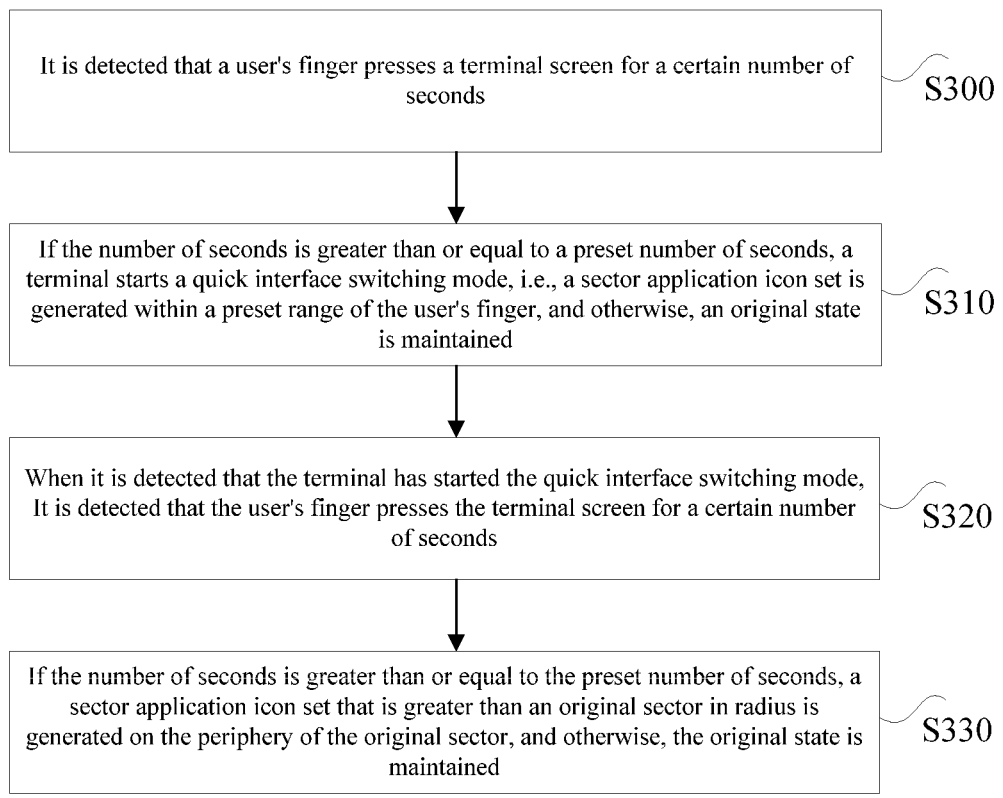
FIG. 6 is an operation flowchart showing quick interface switching by a user according to an exemplary embodiment of the disclosure.

For example, referring to an example shown in FIG. 6, a specific application of the method for switching screen interface according to the present embodiment is shown. That is, the operation flow of quick interface switching for a user mainly includes four steps as follows.

At S300, it is detected that a user's finger presses a terminal screen for a certain number of seconds.

At S310, if the number of seconds is greater than or equal to a preset number of seconds, the terminal starts a quick interface switching mode, i.e., a sector application icon set is generated within a preset range of the user's finger, and otherwise, an original state is maintained.

At S320, when it is detected that the terminal has started the quick interface switching mode, it is detected that the user's finger presses the terminal screen for a certain number of seconds.

At S330, if the number of seconds is greater than or equal to the preset number of seconds, a sector application icon set that is greater than an original sector in radius is generated on the periphery of the original sector, and otherwise, the original state is maintained.

In the embodiments of the disclosure, when the user selects one of the application icons in the sector application icon set to click, the user may directly skip to the selected application interface from the original operation interface, thereby omitting these cumbersome steps of returning to a desktop by clicking a "home key" (e.g., a home key 204 displayed in FIG. 5) and then clicking an application icon on the desktop to skip in, or returning to the desktop by clicking a "back key" (e.g., a back key 203 displayed in FIG. 5) for one or even more periods and then clicking an application icon on the desktop to skip in. At the same period, this quick skipping mode is more convenient for the user to control a mobile phone with one hand, and the user may switch applications with one hand.

A large number of experiments verify that the technical solution of the present embodiment responds to a user's switching to a quick interface switching mode by pressing a screen for a predetermined number of seconds at will, which may satisfy the operation of all users with different finger lengths on any touch point on a large screen, is beneficial to a one-handed operation of the user under a large screen trend, and avoids a cumbersome operation of the user to press a "home key" or "back key" for one or more periods when the user needs to skip to another application from a current application, thereby solving the problems in the related art. For example, a reduced display interface is generally reduced to four corners of a screen by a certain proportion, If the screen size is relatively large and the user's finger is above the screen, the user still cannot control the "home key" or "back key" fixed to the lower portion of the screen by one hand, a screen where it is necessary to press the "home key" or "back key" exists in a terminal, so that the user cannot conveniently perform the one-handed operation under more scenarios.

Figure 3:
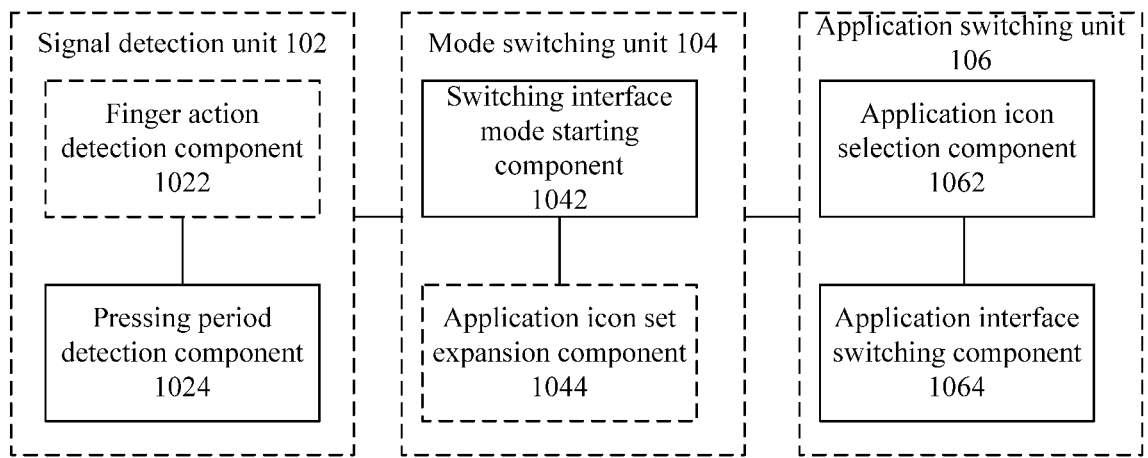
FIG. 3 is a schematic structural diagram of an embodiment of a screen interface switching apparatus according to the disclosure.

According to the embodiments of the disclosure, a device for screen interface switching in correspondence to the method for screen interface switching is also provided. As shown in FIG. 3, the device for screen interface switching includes:

a pressing period detection component 1024, configured to detect a first actual pressing period of pressing any point in a screen operation area by a user's finger. The specific function and processing of the pressing period detection component 1024 refer to S110. By detecting the period of pressing any point in the screen operation area by the user's finger, the detection mode is simple, and the detection result is high in reliability.

It should be noted here that the pressing period detection component 1024 may be operated in a computer terminal as a part of the apparatus. A processor in the computer terminal may execute a function implemented by the above component. The computer terminal may also be smart phones (e.g., Android mobile phones, iOS mobile phones, etc.), tablet computers, palm computers, Mobile Internet Devices (MIDs), PADs, and other terminal devices.

In an implementation mode, the apparatus may further include: a hand-held motion detection component 1022, configured to detect whether the user's finger presses any point in the screen operation area, wherein the pressing period detection component 1024 is configured to detect, in a case that the user's finger presses any point in the screen operation area, a first actual pressing period of pressing any point in the screen operation area by the user's finger. The specific function and processing of the hand-held motion detection component 1022 refer to S100. Herein, the hand-held motion detection component 1022 and the pressing period detection component 1024 may constitute a signal detection unit 102. By detecting the user's finger motion in advance and starting an interface switching mode when the user presses any point on the screen for at least a first predetermined period, the starting efficiency of the interface switching mode may be saved, and the reliability thereof may be improved.

It should be noted here that the hand-held motion detection component 1022 may be operated in a computer terminal as a part of the apparatus. A processor in the computer terminal may execute a function implemented by the above component. The computer terminal may also be smart phones (e.g., Android mobile phones, iOS mobile phones, etc.), tablet computers, palm computers, MIDs, PADs, and other terminal devices.

An switching interface mode starting component 1042 is configured to start, when the first actual pressing period is greater than or equal to a first preset pressing period, an interface switching mode at a current interface, wherein starting an interface switching mode at a current interface includes: generate a set of application icons in the screen operation area where the user's finger can touch for the user to select. The specific function and processing of the switching interface mode starting component 1042 refer to S120. In an embodiment of the disclosure, the switching interface mode starting component 1042 is further configured to maintain, when the first actual pressing period is smaller than the first preset pressing period, the current interface. By using the detection result indicative of the period that the users finger presses and holds any point in the screen operation area to judge whether to start the interface switching mode, the reliability is high, and the accuracy is good.

It should be noted here that the switching interface mode starting component 1042 may be operated in a computer terminal as a part of the apparatus. A processor in the computer terminal may execute a function implemented by the above component. The computer terminal may also be smart phones (e.g., Android mobile phones, iOS mobile phones, etc.), tablet computers, palm computers, MIDs, PADs, and other terminal devices.

In an implementation mode, the apparatus may further include: an application icon set expansion component 1044, configured to: detect, in a case that the interface switching mode has been started, a second actual pressing period of pressing a screen by the user's finger; and expand, in a case that the second actual pressing period is greater than or equal to a second preset pressing period, the set of application icons. The specific function and processing of the application icon set expansion component 1044 refer to S210 and S220. In an embodiment of the disclosure, the application icon set expansion component 1044 is further configured to maintain, when the second actual pressing period is smaller than the second preset pressing period, an interface displaying the set of application icons for the user to select. Herein, the switching interface mode starting component 1042 and the application icon set expansion component 1044 may constitute a mode switching unit 104.

It should be noted here that the application icon set expansion component 1044 may be operated in a computer terminal as a part of the apparatus. A processor in the computer terminal may execute a function implemented by the above component. The computer terminal may also be smart phones (e.g., Android mobile phones, iOS mobile phones, etc.), tablet computers, palm computers, MIDs, PADs, and other terminal devices.

In an implementation mode, the application icon set expansion component 1044 includes an extension display sub-component 10442 or a peripheral display sub-component 10444.

Herein, the extension display sub-component 10442 is configured to extend and display additional application icons in an extending direction of the set of application icons, to display the additional application icons in the screen operation area through the user toggling back and forth along the extension direction of the set of application icons. The extending direction refers to a direction extending from one end of the set of application icons to a direction away from the set of application icons.

The peripheral display sub-component 10444 is configured to expand another set of application icons on the periphery of the set of application icons, to switch displaying of the set of application icons and the other set of application icons in the screen operation area through the user toggling back and forth along the extension direction.

Thus, by generating a set of application icons and correspondingly expanding afterwards, the number of application icons displayed in a limited area of the screen and the update efficiency may be increased to improve the capacity and processing capability of the method for switching screen interface. Moreover, by maintaining the corresponding current interface when the corresponding actual pressing period is shorter than the corresponding preset pressing period, the false operation rate is reduced, the reliability and accuracy of control are improved, and the user experience is further improved.

It should be noted here that the extension display sub-component 10442 and the peripheral display sub-component 10444 may be operated in a computer terminal as a part of the apparatus. A processor in the computer terminal may execute a function implemented by the above component. The computer terminal may also be smart phones (e.g., Android mobile phones, iOS mobile phones, etc.), tablet computers, palm computers, MIDs, PADs, and other terminal devices.

In an embodiment of the disclosure, at least one of the set of application icons and the other set of application icons is a sector application icon set, and at least one is configured to automatically sort application icons according to the user's use habits; and when the set of application icons and the other set of application icons are sector application icon sets, the radius of the other set of application icons is greater than the radius of the set of application icons, so as to improve the convenience of display and check. Through automatic sorting, it is beneficial for the user to enter the required application interface more quickly, the convenience of use is further improved, and the user experience is better.

An application icon selection component 1062 is configured to click an application icon needing to be selected based on the set of application icons; and an application interface switching component 1064 is configured to enable the current interface to skip to a corresponding application interface in one step. The specific function and processing of the application icon selection component 1062 refer to S130. Herein, the application icon selection component 1062 and the application interface switching component 1064 may constitute an application switching unit 106. By directly clicking on the required application icon from the set of application icons, the user may skip to the corresponding application interface in one step. The operation mode is simple, and the period taken is short, which is conducive to further improving the convenience of use and humanization.

It should be noted here that the application icon selection component 1062 may be operated in a computer terminal as a part of the apparatus. A processor in the computer terminal may execute a function implemented by the above component. The computer terminal may also be smart phones (e.g., Android mobile phones, iOS mobile phones, etc.), tablet computers, palm computers, MIDs, PADs, and other terminal devices.

In an embodiment of the disclosure, the user's operations on the screen include at least one of the following operation: a pressing operation, a clicking selection operation, and a toggle operation, specifically one-handed operation. Through the one-handed operation, the convenience and efficiency of using a large-screen terminal by the user are greatly improved, thereby being more humanized.

Figure 5:
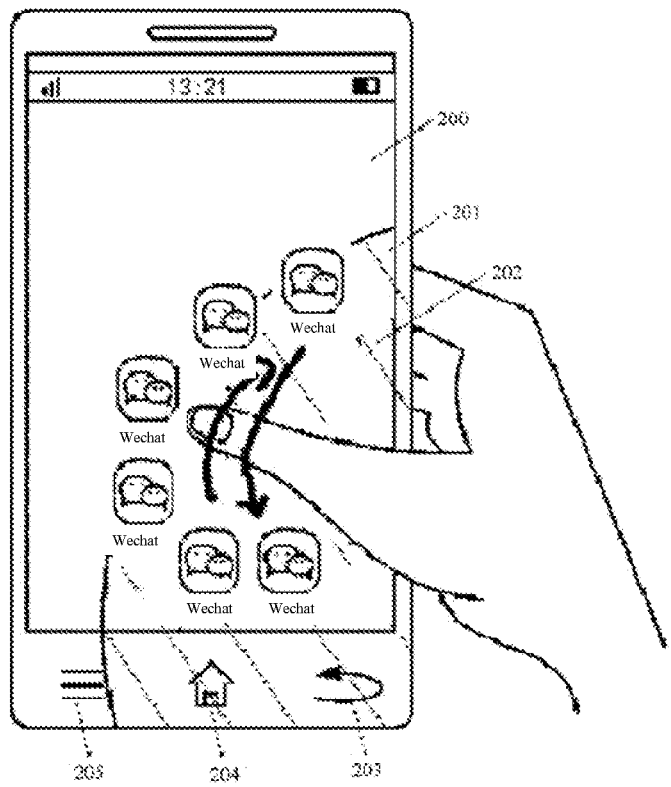
FIG. 5 is a schematic structural diagram of a terminal interface under a one-handed mode according to an exemplary embodiment of the disclosure.

For example, referring to an example shown in FIG. 5, a specific application of the screen interface switching apparatus according to the present embodiment, namely a terminal interface under a one-handed mode, is shown. As shown in FIG. 5, when a user starts a quick interface switching mode (e.g., a preset interface switching mode), a sector icon (e.g., a set of application icons) will appear before a current original interface of a terminal (e.g., original interface 200), and the sector icon is displayed within a preset range (e.g., one-handed control area 201) near the user's grip. For example, in FIG. 5, the user holds the terminal with the right hand, then when the user starts the quick interface switching mode, the sector icon is displayed on the left half of the users finger so as to be within the one-handed control area of the user, which is convenient for the user to control via the users right thumb while holding the terminal.

However, in addition to a display shape more in line with the one-handed control of the user, because the one-handed control area of the user is still limited, application icons that can be simultaneously displayed within this limited small area are extremely limited, so in order to solve this limitation problem, there are two methods for expanding more application icons in this example.

First, the user may toggle up and down along an arc within a range controllable by one hand in an up-down sliding direction as shown in FIG. 5, so that it is convenient for the user to cyclically toggle more application icons for the user to click and switch. The terminal sorts all applications of the user, and the most frequently used applications are ranked first. In this way, the user may first display in a sector display area when switching to the quick interface switching mode. If an application to which the user needs to switch is not in the previously displayed applications, the user may toggle up and down to display all applications in terminals of all users.

Second, in addition to that the user may toggle the sector graph up and down, the second method for expanding more application icons provided in the embodiment of the disclosure is that when the user starts the quick interface switching mode, the user may display a circle of sector icon sets. If the user presses a preset number of seconds again in this mode, the terminal may generate an icon set slightly greater than an original sector icon set in radius outside the original sector icon set, and the sector is also within a range controllable by one hand of the user, so the terminal may display more icons, and the user may switch to more other application interfaces. Similarly, the terminal will sort all applications of the user, and display a plurality of most commonly used preset application icons in the inner circle sector, while less-started application icons are displayed in the outer circle sector.

Both the two above-mentioned display methods enabling a user to expand more applications may generate a user-friendly operation menu according to user's preferences and usage habits.

Thus, there are two forms of the above-mentioned method for displaying a sector icon. The first user may cyclically toggle a sector up and down, more application icons may be displayed in a limited area for the user to select, and a large sector may be expanded on the periphery of the sector according to a long-press screen period of the user, so that more application icons may also be displayed in a limited area for the user to select. Since the display method is in a preset area near the finger, this area is a range controllable by the user's finger, which fully conforms to the convenience of the one-handed operation. Both a method of cyclically toggling a sector and a method of expanding a greater sector on the periphery of a sector may enable a user to operate more menus or application icons with one hand.

Figure 2:
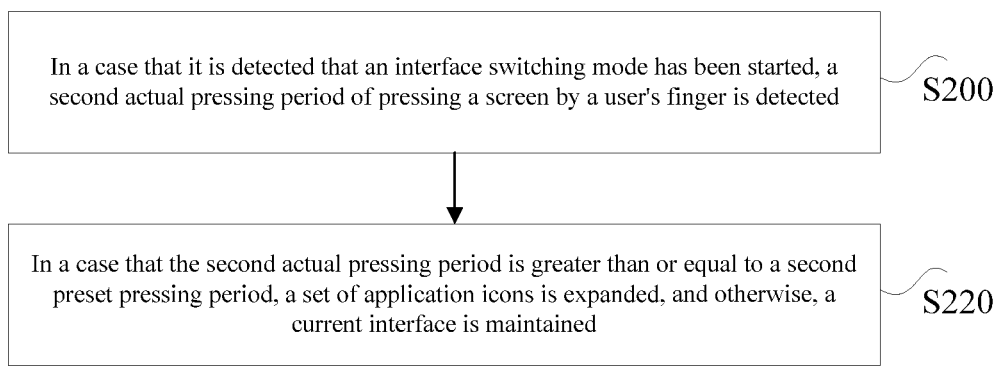
FIG. 2 is a flowchart of an embodiment of expansion processing of an application icon set in the method of the disclosure.

Since the processing and functions implemented by the apparatus of the present embodiment basically correspond to the embodiments, principles and examples of the foregoing method as shown in FIG. 1 and FIG. 2, the parts in the description of the present embodiment, which are not exhaustive, may be referred to the relevant description in the foregoing embodiment, which will not be elaborated herein.

A large number of experiments verify that the technical solution of the embodiments of the disclosure directly displays a sector icon in a preset area near the finger in a current page by the switching to the quick interface switching mode, and directly clicks the application icon to skip to another application, thereby achieving a quick operation of one-step skip and optimizing user experience.

Each functional component provided in the embodiment of the disclosure may be operated in a mobile terminal, a computer terminal, or a similar computing apparatus, and may also be stored as a part of a storage medium.

Thus, the embodiments of the disclosure may provide a mobile terminal that may be any one mobile terminal device in a mobile terminal group. Alternatively, in the present embodiment, the above mobile terminal may also be replaced with a terminal device such as a computer terminal.

Alternatively, in the present embodiment, the above mobile terminal may be located in at least one of a plurality of network devices of a mobile network.

In the present embodiment, the above mobile terminal may execute program codes for the following steps in the method for switching screen interface: detecting a first actual pressing period of pressing any point in a screen operation area by a user's finger; when the first actual pressing period is greater than or equal to a first preset pressing period, starting an interface switching mode at a current interface, that is, generating a set of application icons in the screen operation area where the user's finger can touch for the user to select; and based on the set of application icons, enabling the current interface to skip to a corresponding application interface in one step by clicking an application icon needing to be selected.

Alternatively, the mobile terminal may include: one or more processors, a memory and a transmission apparatus.

Herein, the memory may be configured to store a software program and a component, such as a program instruction/component corresponding to the method and apparatus for switching screen interface in the embodiment of the disclosure, and the processor executes various function application and data processing by running the software program and the component stored in the memory. That is, the above-mentioned method for switching screen interface is implemented. The memory may include a high-speed Random Access Memory (RAM), and may further include a non-volatile memory such as one or more disk storage apparatus, flash memories, or other non-volatile solid memories. In some examples, the memory may further include a memory remotely disposed with respect to a processor, and these remote memories may be connected to a terminal through a network. Examples of such networks include, but are not limited to, the Internet, intranets, local area networks, mobile communication networks, and combinations thereof.

The above-mentioned transmission apparatus is configured to receive or transmit data via a network. Specific examples of the above network may include a wired network and a wireless network. In one example, the transmission apparatus includes a Network Interface Controller (NIC) that may be connected to other network devices and routers via a network cable so that it may communicate with the Internet or a local area network. In one example, the transmission apparatus is an RF component for communicating with the Internet in a wireless manner.

Herein, specifically, the memory is configured to store preset action conditions, preset permission user information and an application program.

The processor may call information and application programs stored in the memory through the transmission apparatus, so as to execute program codes of the method steps of each alternative or preferred embodiment in the above method embodiments.

A person of ordinary skill in the art may understand that the computer terminal may also be smart phones (e.g., Android mobile phones, iOS mobile phones, etc.), tablet computers, palm computers, MIDs, PADs, and other terminal devices.

A person of ordinary skill in the art may understand that all or some steps in each method in the above embodiments may be completed by instructing relevant hardware of a terminal device through a program, wherein the program may be stored in a computer-readable storage medium, and the storage medium may include: a flash disk, a Read-Only Memory (ROM), an RAM, a magnetic disk or an optical disk.

The embodiment of the disclosure also provides a storage medium. Alternatively, in the present embodiment, the above storage medium may be used to save program codes executed by the method for switching screen interface provided in the above method embodiment and apparatus embodiment.

Alternatively, in the present embodiment, the above storage medium may be located in any one computer terminal in a computer terminal group in a computer network, or located in any one mobile terminal in a mobile terminal group.

Alternatively, in the present embodiment, the storage medium is configured to store program codes for executing the following steps: detecting a first actual pressing period of pressing any point in a screen operation area by a user's finger; when the first actual pressing period is greater than or equal to a first preset pressing period, starting an interface switching mode at a current interface, that is, generating a set of application icons in the screen operation area where the user's finger can touch for the user to select; and based on the set of application icons, enabling the current interface to skip to a corresponding application interface in one step by clicking an application icon needing to be selected.

Alternatively, in the present embodiment, the storage medium may also be configured to store program codes for various preferred or alternative method steps provided by the method for switching screen interface.

The method and apparatus for switching screen interface according to the embodiments of the disclosure are described above by way of example with reference to the accompanying drawings. However, those skilled in the art should understand that for the method and apparatus for switching screen interface proposed by the embodiments of the disclosure, various improvements may be made without departing from the content of the embodiments of the disclosure. Therefore, the protection scope of the embodiments of the disclosure should be determined by the contents of the appended claims.

According to the embodiments of the disclosure, a terminal in correspondence to the screen interface switching apparatus is also provided. The terminal at least includes: the above-mentioned screen interface switching apparatus.

Figure 7:
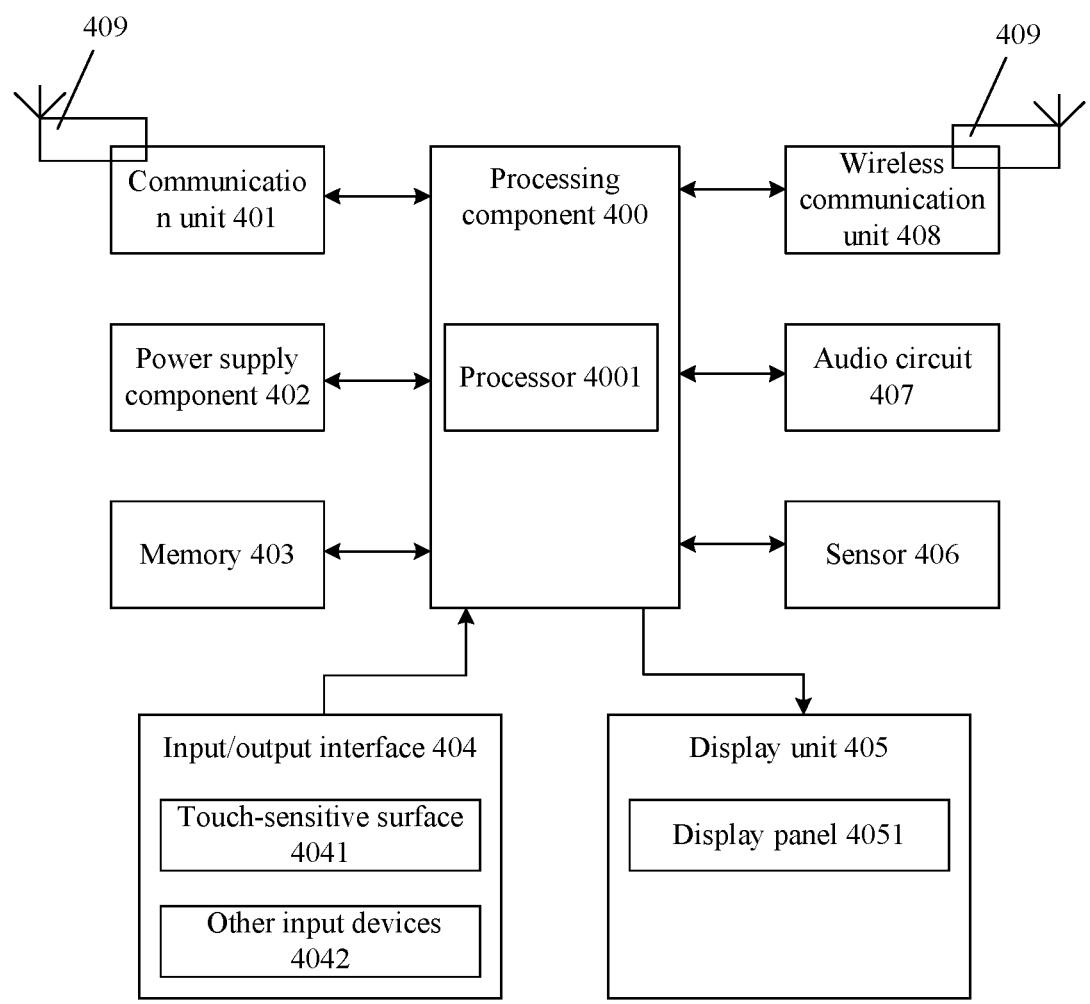
FIG. 7 is a schematic structural diagram of a mobile terminal suitable for quickly switching interfaces according to an exemplary embodiment of the disclosure.

For example, referring to an example shown in FIG. 7, a specific display mode of the terminal according to the present embodiment, namely a mobile terminal device for quickly switching interfaces, is shown. The terminal device may be a mobile phone, a computer, a digital broadcast terminal, a message transceiving device, a game console, a tablet device, a medical device, a fitness device, a personal digital assistant, and the like.

In an embodiment of the disclosure, the terminal device may include a communication unit (e.g., communication unit 401), a memory including one or more computer-readable storage media, an input/output unit (e.g., input/output interface 404), a display unit (e.g., display unit 405) 405), a sensor (e.g., sensor 406), an audio circuit (e.g., audio circuit 407), a Wireless Fidelity (WIFI) component, a processor including one or more processing cores, and a power supply. Those skilled in the art may understand that the terminal device structure shown in the figures does not constitute a limitation on the terminal device, and may include components more or less than the illustrated components, or combine some components, or different component arrangements. Here in:

The communication unit may be configured to receive and send signals during the process of sending and receiving information or during a conversation. The communication unit may be a network communication device such as an RF circuit (e.g., RF component 409), a router, and a modem. In particular, when the communication unit is an RF circuit, after the downlink information of a base station is received, it is processed by one or more processors (e.g., processing component 400, which may include a processor 4001); in addition, uplink data is sent to the base station. Typically, the RF circuit as a communication unit includes, but is not limited to, an antenna, at least one amplifier, a tuner, one or more oscillators, a Subscriber Identity Component (SIM) card, a transceiver, a coupler, a Low Noise Amplifier (LNA), a duplexer, etc. In addition, the communication unit may also communicate with a network and other devices through wireless communication (e.g., wireless communication unit 408). The wireless communication may use any communication standard or protocol, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an E-mail, Short Messaging Service (SMS), etc. A memory (e.g., memory 403) may be configured to store a software program and a component, and the processor executes various function APPs and data processing by running the software program and the component stored in the memory. The memory may mainly include a storage program region and a storage data region, wherein the storage program region may store an operation system, an APP needed for at least one function (e.g., a sound playing function, an image playing function, etc.), etc; and the storage data region may store data (e.g., audio data, phone book, etc.) created according to use of the mobile phone. In addition, the memory may include a high-speed RAM, and may further include a non-volatile memory such as at least one disk storage device, a flash device, or other non-volatile solid storage devices. Correspondingly, the memory may further include a memory controller to provide access of a processor and an input unit to the memory.

The input unit may be configured to receive input digital or character information and generate keyboard, mouse, operating rod, optical or track ball signal inputs associated with user setting and functional control. In an embodiment of the disclosure, the input unit may include a touch-sensitive surface (e.g., touch-sensitive surface 4041) and other input devices (e.g., other input devices 4042). The touch-sensitive surface, also known as a touch display screen or touchpad, may collect touch operations (such as user operations using a finger, a touch pen, or any other suitable objects or accessories on or near the touch-sensitive surface), and may drive a corresponding connection apparatus according to a preset program. Alternatively, the touch-sensitive surface may include two parts namely a touch detection apparatus and a touch controller. Herein, the touch detection apparatus detects the touch orientation of a user, detects a signal brought by a touch operation, and sends the signal to the touch controller; and the touch controller receives touch information from the touch detection apparatus, converts it into contact coordinates, sends it to the processor, and can receive and execute a command sent by the processor. In addition, the touch-sensitive surface may be implemented by using resistive, capacitive, infrared, and surface acoustic waves. In addition to the touch-sensitive surface, the input unit may also include other input devices. In an embodiment of the disclosure, other input devices may include, but are not limited to, one or more of a physical keyboard, a functional key (such as a volume control key and a switch key), a track ball, a mouse and an operating rod.

The display unit may be configured to display information input by the user or information provided for the user and various graphical user interfaces of the terminal device. These graphical user interfaces may be composed of graphics, text, icons, video, and any combination thereof. The display unit may include a display panel (e.g., display panel 4051), and alternatively, the display panel may be configured in a form of a Liquid Crystal Display (LCD), an Organic Light-Emitting Diode (OLED), etc. Further, the touch-sensitive surface may cover the display panel. When the touch-sensitive surface detects a touch operation on or near the touch-sensitive surface, it is transmitted to the processor to determine the type of a touch event. The processor then provides corresponding visual output on the display panel according to the type of the touch event. The touch-sensitive surface and the display panel may implement input and output functions as two separate components, but in some embodiments, the touch-sensitive surface may be integrated with the display panel to implement the input and output functions.

The terminal device may further include at least one sensor such as a light sensor, a motion sensor and other sensors. The light sensor may include an ambient light sensor and a proximity sensor, wherein the ambient light sensor may adjust the luminance of the display panel according to the brightness of ambient light, and the proximity sensor may close the display panel and/or backlight when the terminal device moves to an ear. As one of the motion sensors, an accelerometer sensor may detect the magnitude of an accelerated speed in each direction (generally, three-axis), the size and direction of a gravity may be detected while resting, and the accelerometer sensor may be configured to identify an APP of a phone gesture (e.g., horizontal and vertical screen switching, relevant games, and magnetometer gesture calibration), and vibration identification relevant functions (e.g., pedometer and knocking). Other sensors such as a gyroscope sensor, a barometer sensor, a hygrometer sensor, a thermometer sensor and an infrared sensor configurable for the terminal device will not be elaborated herein.

The audio circuit, a loudspeaker and a microphone may provide an audio interface between the user and the terminal device. The audio circuit may transmit an electric signal converted from the received audio data to the loudspeaker, and the loudspeaker converts the electric signal into a sound signal for output. Besides, the microphone converts a collected sound signal into an electric signal, the audio circuit converts the received electric signal into audio data and then outputs the audio data to the processor for processing, the audio data is transmitted to another terminal device via the RF circuit, or the audio data is output to the memory for further processing. The audio circuit may further include an earplug jack to provide communication between a peripheral earphone and the terminal device.

In order to implement wireless communication, the terminal device may be configured with a wireless communication unit, and the wireless communication unit may be a WIFI component. WIFI belongs to a short-range wireless transmission technology, the terminal device may assist the user in E-mail receiving and sending, webpage browsing, access to streaming media and the like by means of the wireless communication unit, and it provides a wireless wideband internet access for the user. Although the wireless communication unit is shown in the figure, it may be understood that it does not belong to necessary components of the terminal device and can be totally omitted without changing the essence of the embodiments of the disclosure as required.

The processor is a control center of the terminal device, and is configured to connect all parts of the whole phone by utilizing various interfaces and lines, to run or execute the software program and/or the component stored in the memory, and to call data stored in the memory to execute various functions and processing data of the terminal device, so as to wholly monitor the phone. Alternatively, the processor may include one or more processing cores. In an embodiment of the disclosure, the processor may be integrated with an application processor and a modulation-demodulation processor, wherein the application processor mainly processes an operation system, a user interface, an application program and the like, and the modulation-demodulation processor mainly processes wireless communication. It may be understood that the modulation-demodulation processor may not be integrated into the processor.

The terminal device may further include a power supply (such as a battery) for supplying power to each component. In an embodiment of the disclosure, the power supply (e.g., power supply component 402) may be connected with the processor logically via a power supply management system, so as to implement functions of charging, discharging and power consumption management by means of the power supply management system. The power supply may further include one or more of a DC or AC power supply, a recharging system, a power failure detection circuit, a power converter or an inverter, a power status indicator, and any other components.

It is understandable that, the terminal device may further include a camera, a Bluetooth component and the like, which are not shown, though, will not be elaborated herein. Similarly, in the present embodiment, the terminal device further includes a memory, and one or more programs, wherein one or more programs are stored in the memory, and are configured to be executed by the one or more processors. The one or more programs contain instructions for performing the method provided by the present embodiment.

Figure 4:
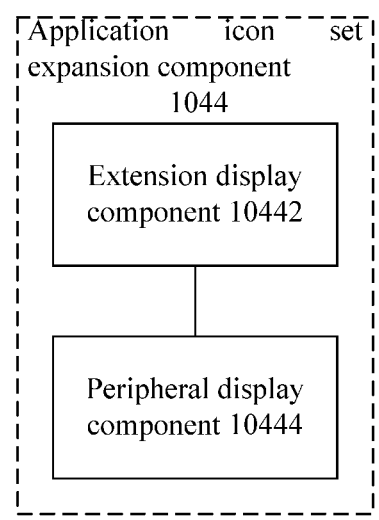
FIG. 4 is a schematic structural diagram of an embodiment of an icon set expansion component in the apparatus of the disclosure.

Since the processing and functions implemented by the terminal of the present embodiment basically correspond to the embodiments, principles and examples of the foregoing method as shown in FIG. 3 and FIG. 4, the parts in the description of the present embodiment, which are not exhaustive, may be referred to the relevant description in the foregoing embodiment, which will not be elaborated herein.

A large number of experiments verify that by means of the technical solution of the embodiments of the disclosure, a method provided in the embodiment of the disclosure responds to a user's switching to a quick interface switching mode by pressing a screen for a predetermined number of seconds at will, directly displays a sector icon in a preset area near the finger in a current page by the switching to the quick interface switching mode, and directly clicks the application icon to skip to another application, thereby achieving a quick operation of one-step skip and optimizing user experience.

In summary, it is easily understood by those skilled in the art that the above advantageous manners may be freely combined and superposed without conflicts.

It should also be noted that the terms "including", "containing" or any other inflexions thereof are intended to cover non-exclusive inclusions, such that a process, method, article or device including a series of elements not only includes those elements, but also includes other elements that are not clearly listed, or further includes elements inherent to the process, method, article or device. Under the condition of no more limitations, it is not excluded that additional identical elements exist in the process, method, article or device including elements defined by a sentence "including a . . . ".

Those skilled in the art shall understand that the embodiments of the disclosure may be provided as a method, a system or a computer program product. Thus, forms of hardware embodiments, software embodiments or embodiments integrating software and hardware may be adopted in the embodiments of the disclosure. Moreover, a form of the computer program product implemented on one or more computer available storage media (including, but not limited to, a disk memory, a CD-ROM, an optical memory and the like) containing computer available program codes may be adopted in the embodiments of the disclosure.

The foregoing descriptions are merely embodiments of the disclosure and are not intended to limit the embodiments of the disclosure. For those skilled in the art, the disclosure may have various changes and modifications. Any modification, equivalent replacement, and improvement made within the spirit and principle of the disclosure shall fall within the scope of the claims of the disclosure.

What is claimed is:

1. A method for screen interface switching, comprising:
    detecting a first actual pressing period of pressing any point in a screen operation area by a user's finger;
    in a case that the first actual pressing period is greater than or equal to a first preset pressing period, starting an interface switching mode at a current interface, wherein starting an interface switching mode at a current interface comprises: generating a set of application icons in the screen operation area where the user's finger can touch for the user to select; and
    based on the set of application icons, enabling the current interface to skip to a corresponding application interface in one step by clicking an application icon needing to be selected;
    in a case that the interface switching mode has been started, detecting a second actual pressing period of pressing a screen by the user's finger; and in a case that the second actual pressing period is greater than or equal to a second preset pressing period, expanding the set of application icons;
    wherein expanding the set of application icons comprises: extending and displaying additional application icons in an extending direction of the set of application icons, to display the additional application icons in the screen operation area through the user toggling back and forth along the extension direction of the set of application icons;

wherein expanding the set of application icons further comprises:
expanding another set of application icons on the periphery of the set of application icons, to switch displaying of the set of application icons and the other set of application icons in the screen operation area through the user toggling back and forth along the extension direction.

2. The method as claimed in claim 1, further comprising:
detecting whether the user's finger presses any point in the screen operation area; and
in a case that the user's finger presses any point in the screen operation area, detecting a first actual pressing period of pressing any point in the screen operation area by the user's finger.

3. The method as claimed in claim 2, further comprising:
in a case that the first actual pressing period is smaller than the first preset pressing period, maintaining the current interface;
and/or,
in a case that the second actual pressing period is smaller than the second preset pressing period, maintaining an interface displaying the set of application icons for the user to select.

4. The method as claimed in claim 3, wherein at least one of the set of application icons and the other set of application icons is a sector application icon set, and at least one is configured to automatically sort application icons according to the user's use habits; and in a case that the set of application icons and the other set of application icons are sector application icon sets, the radius of the other set of application icons is greater than the radius of the set of application icons;
and/or,
the user's operations on the screen comprise at least one of the following operation: a pressing operation, a clicking selection operation, and a toggle operation.

5. A apparatus for screen interface switching, comprising:
a pressing period detection component, configured to detect a first actual pressing period of pressing any point in a screen operation area by a user's finger;
an switching interface mode starting component, configured to start, in a case that the first actual pressing period is greater than or equal to a first preset pressing period, an interface switching mode at a current interface, wherein starting an interface switching mode at a current interface comprises: generate a set of application icons in the screen operation area where the user's finger can touch for the user to select;
an application icon selection component, configured to click an application icon needing to be selected based on the set of application icons; and an application interface switching component, configured to enable the current interface to skip to a corresponding application interface in one step;
an application icon set expansion component, configured to: detect, in a case that the interface switching mode has been started, a second actual pressing period of pressing a screen by the user's finger; and expand, in a case that the second actual pressing period is greater than or equal to a second preset pressing period, the set of application icons;
wherein the application icon set expansion component comprises: an extension display sub-component, configured to extend and display additional application icons in an extending direction of the set of application icons, to display the additional application icons in the screen operation area through the user toggling back and forth along the extension direction of the set of application icons;
wherein the application icon set expansion component further comprises:
a peripheral display sub-component, configured to expand another set of application icons on the periphery of the set of application icons, to switch displaying of the set of application icons and the other set of application icons in the screen operation area through the user toggling back and forth along the extension direction.

6. The apparatus as claimed in claim 5, further comprising:
a hand-held motion detection component, configured to detect whether the user's finger presses any point in the screen operation area,
wherein the pressing period detection component is configured to detect, in a case that the user's finger presses any point in the screen operation area, a first actual pressing period of pressing any point in the screen operation area by the user's finger.

7. The apparatus as claimed in claim 6, wherein
the switching interface mode starting component is further configured to maintain, in a case that the first actual pressing period is smaller than the first preset pressing period, the current interface;
and/or,
the application icon set expansion component is further configured to maintain, in a case that the second actual pressing period is smaller than the second preset pressing period, an interface displaying the set of application icons for the user to select.

8. The apparatus as claimed in claim 7, wherein at least one of the set of application icons and the other set of application icons is a sector application icon set, and at least one is configured to automatically sort application icons according to the user's use habits; and in a case that the set of application icons and the other set of application icons are sector application icon sets, the radius of the other set of application icons is greater than the radius of the set of application icons;
and/or,
the user's operations on the screen comprise at least one of the following operation, a pressing operation, a clicking selection operation, and a toggle operation.

9. A terminal, comprising a screen interface switching apparatus as claimed in claim 5.

10. The apparatus as claimed in claim 6, wherein
the switching interface mode starting component is further configured to maintain, in a case that the first actual pressing period is smaller than the first preset pressing period, the current interface;
and/or,
the application icon set expansion component is further configured to maintain, in a case that the second actual pressing period is smaller than the second preset pressing period, an interface displaying the set of application icons for the user to select.

11. The apparatus as claimed in claim 6, wherein
the switching interface mode starting component is further configured to maintain, in a case that the first actual pressing period is smaller than the first preset pressing period, the current interface;
and/or,
the application icon set expansion component is further configured to maintain, in a case that the second actual pressing period is smaller than the second preset pressing period, an interface displaying the set of application icons for the user to select.

12. The method as claimed in claim 4, wherein the user's operations comprises: one or more one-handed operations.

13. The method as claimed in claim 2, further comprising:
in a case that the first actual pressing period is smaller than the first preset pressing period, maintaining the current interface;
and/or,
in a case that the second actual pressing period is smaller than the second preset pressing period, maintaining an interface displaying the set of application icons for the user to select.

14. The method as claimed in claim 2, further comprising:
in a case that the first actual pressing period is smaller than the first preset pressing period, maintaining the current interface;
and/or,
in a case that the second actual pressing period is smaller than the second preset pressing period, maintaining an interface displaying the set of application icons for the user to select.

* * * * *